United States Patent [19]

Wu

[11] Patent Number: 4,698,793
[45] Date of Patent: Oct. 6, 1987

[54] METHODS FOR PROCESSING SONIC DATA

[75] Inventor: Peter Wu, Houston, Tex.

[73] Assignee: Schlumberger Technology Corporation, Houston, Tex.

[21] Appl. No.: 612,964

[22] Filed: May 23, 1984

[51] Int. Cl.$^4$ ............................................. G01V 1/21
[52] U.S. Cl. ....................................... 367/32; 367/28; 364/422
[58] Field of Search ....................... 367/26, 29, 30, 31, 367/32; 364/422

[56] References Cited

U.S. PATENT DOCUMENTS

| | | | |
|---|---|---|---|
| 4,543,648 | 9/1985 | Hsu | 367/29 |
| 4,575,830 | 3/1986 | Ingram et al. | 367/26 |
| 4,594,691 | 6/1986 | Kimball et al. | 364/422 X |

Primary Examiner—Thomas H. Tarcza
Assistant Examiner—Mark Hellner
Attorney, Agent, or Firm—Henry N. Garrana; Michael D. Rostoker; Francis Hagel

[57] ABSTRACT

A method of sonic logging in which there is established at a depth of interest in a borehole a set of peak matrices comprised of peak vectors representative of a plurality of different characteristics of sonic signals traversing an earth formation. A set of rules is established based upon borehole sonic characteristics including the utilization of past histories of slowness and coherence values of wave components of interest. The matrices are searched in accordance with the rules to identify the presence in the sonic signals of wave components of interest, such, for example, as casing, compressional, shear and Stoneley. The identified wave components are recorded as a function of depth of interest, and the aforesaid steps are repeated at each depth of interest.

The characteristics sought for each component include the maximum of peak coherence, the slowness at peak coherence, the time occurrence at peak coherence, coherent energy at peak coherence, coherent value at peak energy, the slowness at peak energy, the time occurrence at peak energy, and coherent energy at peak energy.

The method is applicable to both open hole and cased hole sonic logging.

9 Claims, 16 Drawing Figures

```
Set up distribution function buffer pointer
   IC1 = JMOD (ICOUNT, NCSD)
   IC1P = ICI + 1
   IC1M = IC1 - 1
   IF (IC1.EQ. 0)         THEN
      IC1 = NCSDFS
      IC1P = 1
   END IF
   IF (IC1. EQ. 1)   IC1M = NCSDFS
```
⎯61

METHODS FOR PROCESSING SONIC DATA

BACKGROUND OF THE INVENTION

1. Field of the Invention

The invention is in the field of sonic well logging and relates particularly to a method of filtering sonic log data to provide more accurate identification of the arrival and slowness of such sonic wave components as casing, compressional, shear and Stoneley.

2. Description of the Prior Art

Sonic well logging is used to provide surveys for formations traversed by boreholes. Many techniques and tools for carrying out sonic well logging are extensively described in the literature. In particular, measurements are made of the velocities of sonic waves to reveal valuable information concerning the types of rocks and the porosity of the rocks comprising the formations surrounding the borehole. The velocities are more commonly expressed as slowness, a sonic parameter, measured in micro-seconds per foot.

Under ideal conditions, the identification of the various components comprising the sonic wave may be accomplished with ease. In the classic textbook case, the first arriving wave in a cased borehole is the casing wave, the second is the compressional wave, followed by the shear wave and finally the Stoneley wave. In practice, however, the determination of slowness is complicated by a number of factors. For example, at extreme depth, the compressional wave may arrive ahead of the casing wave and the shear wave arrival can be difficult to detect because it propagates more slowly and its arrival under field conditions will typically be obscured by compressional energy and other acoustic modes inside the bore hole. The determination, therefore, of shear slowness directly from arrival time is at best difficult and at times impossible.

There are two major approaches in processing sonic data to obtain information such as propagation velocity, energy, and attenuation of the individual wave components such as casing, compressional, shear and Stoneley waves from the overall wave train. The first is a model base approach. This approach assumes a relationship between various wave components. The signal processing technique is very efficient and the outputs are specific. One example of the model base approach is a direct phase determination method which assumes that the compressional wave is the wave component that arrives first, and the shear wave is related to the compressional wave via the Poisson's ratio relationship. However, if the wave train components arrive in different orders than assumed, or if indeed the wave components overlap, erroneous results are obtained.

The second approach does not assume any initial relationship between the various components. The signal processing technique gives rise to data that is more comprehensive in the sense that the results are less specific, including both correct and erroneous information. However, the important factor is that the results do contain representations of the correct parameters sought to be measured. One such technique, the slowness time coherence method (STC Method) is an example of this approach. The method is described in co-pending application filed by co-employees Christopher V. Kimball and Thomas L. Marzetta, entitled "Sonic Well Logging" now U.S. Pat. No. 4,594,691, executed on Dec. 29, 1981 and assigned to the same assignee as the present application.

In the Kimball et al application, the method includes the production of sonic logs which represent the receipt, at successive borehole depth intervals or levels, of sonic signals by receivers which are spaced along the length of a borehole tool from each other and from at least one transmitter of the sonic signals. These sonic logs are analyzed to determine whether they include an arrival of sonic energy with a time T and the slowness S for all (T, S) combinations which have been found to be reasonable from past experience. The measure of interest is called a coherence measure and is designated $R^2$ (T, S). It corresponds to a measure sometimes called "Semblance" in seismic work. For each given depth level z in the borehole, the surface made up of the determined measures of coherence for (T, S) combinations tends to have peaks corresponding to the different components of the sonic signals arriving at the receivers, for example, the casing, the compressional, the shear and the Stoneley components. It has been discovered that the arrival time and slowness associated with these peaks have unexpectedly significant relationship to the subsurface formation and that, accordingly, new logs associated with parameters of those peaks can be produced which give significant clues to the subsurface formation. Because the STC method is "robust," it gives rise to peaks that are representative of the characteristics sought to be measured as well as peaks which are erroneous representation of the characteristics. Accordingly, the results of the STC method require a post-processing procedure to interpret the peaks and thereby produce accurate logs of slowness, energies, and other characteristics for the casing, compressional, shear and Stoneley wave components. Such a post-processing procedure is provided in accordance with the present invention.

SUMMARY OF THE INVENTION

In accordance with the present invention, there is established a set of conditions and values for parameters based upon the borehole acoustics and expected sonde response. The method is employed to sweep through the results of the STC method to identify casing, compressional, shear and Stoneley wave components. Examples of the conditions and values of the parameters include:

1. Casing arrival has a fairly constant slowness near 57 microseconds per foot

2. Other than the casing arrival, the compressional wave is the first component in the wave train.

3. Given a compressional slowness Sc, the range of shear slowness, Ss, is bounded by $1.3 \times Sc < Ss < 2.5 \times Sc$.

4. The Stoneley slowness is larger than that of shear slowness.

5. The Stoneley wave usually has highest amplitudes in the wave train.

6. The slowness of a wave component should be consistent with the integrated arrival time. That is, the integration of the slowness at depth between transmitter and receiver plus the travel time through the mud should be close to the wave component arrival time.

7. The STC processing is assumed to produce an average slowness of the formation spanned by the receiver array. Therefore, the upper and lower bounds of the variation of slowness of a wave component between two successive depths is predictable.

The method of the present invention comprises the steps of establishing at a depth of interest in a borehole a set of peak matrices comprised of peak vectors representative of a plurality of different characteristics of sonic signals traversing an earth formation. A set of values is established based upon borehole sonic characteristics and thereafter the matrices are searched in accordance with the values to identify the presence in the sonic signals of selected wave components. The identified wave components are recorded as a function of depth and the foregoing steps are repeated at each depth of interest.

In the present invention, the casing peak is identified via the casing slowness distribution function. The number of peaks with slowness within a given casing slowness range and whose arrival times are within a predetermined amount of the integrated casing time and also having a coherence value greater than a given coherence cut for casing are counted over a given number of waveform sets. If this total number exceeds a predetermined value, a search will be initiated for the peak with maximum coherence value whose slowness is within the given casing slowness range. The peak thus found is called the casing peak. This peak will be eliminated from the peak matrix and the remaining peaks in the matrix will be subjected to further selection processing for compressional, shear and Stoneley peaks.

In one aspect of the present invention, the compressional arrival, is determined by selecting the peaks with slowness within a given compressional limit and having a coherence value greater than a given coherence cut for compressional to form a subgroup. The subgroup is screened to delete those peaks whose time of arrival deviate from an integrated compressional time by more than a predetermined amount and there is then selected the peak having a minimum arrival time as a candidate for compressional arrival.

A second candidate for compressional peak is selected as the peak of maximum coherence value from the group of peaks with slowness within a slowness range determined dynamically based on the past history of the compressional peak slowness and whose arrival times are within a predetermined amount of the integrated compressional time and also having a coherence value greater than a given coherence cut for compressional. If only one of the above candidates exists, the existing peak is chosen as the compressional peak. If both candidates exist, the one with higher coherence peak is selected as the compressional peak.

In yet another aspect of the invention, the shear wave arrival is determined by selecting a subgroup of peaks with slowness S bounded by the following two constraints:

$S_{SLO} < S < S_{SUP}$, and $Sc \times 1.3 < S < Sc \times 2.5$ where Sc is the compressional slowness, and ($S_{SLO}$, $S_{SUP}$) is a slowness range for shear, determined dynamically based on the past history of slowness of shear peaks.

The subgroup is further screened to delete peaks with arrival time greater than a predetermined value, and from the remaining peaks there is selected as the shear arrival the peak with the highest coherence value.

The Stoneley arrival is determined by selecting a subgroup of peaks having slowness larger than a given fluid slowness and whose slownesses are bounded by a Stoneley slowness range determined dynamically based on the past history of the slowness of Stoneley peaks and also having a coherence value higher than the coherence-cut for Stoneley waves. The subgroup of peaks is screened to delete those peaks having arrival times deviating from an integrated Stoneley arrival time by a predetermined amount, and from the remaining peaks there is selected the peak having the highest coherence energy as representative of Stoneley arrival.

BRIEF DESCRIPTION OF THE DRAWINGS

FIGS. 3A 3B, 3C and 3D are detailed flow diagrams illustrating the steps utilized in establishing initial parameters for the carrying out of the present invention;

DESCRIPTION OF THE PREFERRED EMBODIMENTS

Figure 1:
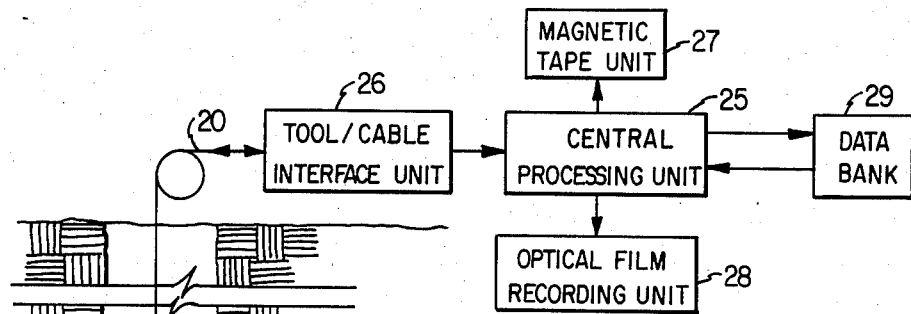
FIG. 1 is a schematic representation of a well logging system incorporating components useful in the practice of the present invention.
Figure 1:
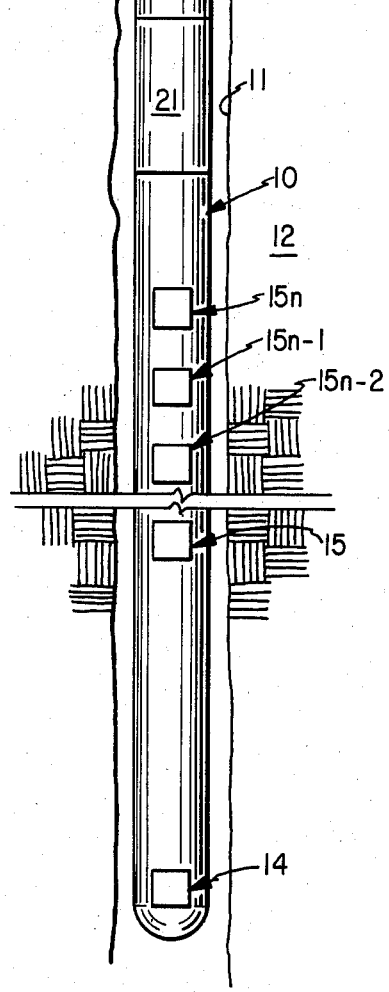

A system for carrying out the method of the present invention is illustrated in FIG. 1. The system includes a logging tool or sonde 10 positioned within borehole 11 for traverse along adjacent earth formations 12. The sonde 10 includes an acoustic transducer, a transmitter 14, utilized to generate acoustic energy in the form of sonic pulses in the borehole fluid within the borehole 10 for refraction through and along the surrounding formation 12. The sonde also includes a plurality of receiving transducers 15 utilized to receive sonic signals propagating through the formation 12 and through the borehole fluid. A minimum of four receiving receivers 15 are required in the practice of the present invention. However, a larger number is desirable, as many as 12. Accordingly, the sonde 10 has been shown separated and the receivers numbered 15n, 15n-1 and 15n-2, in order to establish that while 4 receivers may be employed, a larger number is preferred in gathering data for the practice of the present invention.

The transmitter 14 is typically spaced from 8–10 feet from the near receiver 15 and the receivers in the receiver array 15–15n are spaced one from the other a distance less than half a wavelength of the sonic signal generated by the transmitter 14. For example, the receivers 15 would be spaced approximately 6 inches apart. Bow-spring centralizers (not shown) are utilized to maintain the sonde 10 centered in the borehole 11.

Several times each second, on command from surface control equipment, a particular transmitter and receiver combination is selected and the transmitter is excited or fired. Commands are sent down the armored wireline cable 20 supporting the tool 10 in the borehole 11, and are decoded in an electronic cartridge 21 interconnecting the cable 20 and the tool or sonde 10. The received sonic wave form for each firing is amplified in the cartridge 21 and transmitted up the cable 20 to surface equipment.

The mode of transmission to the surface may be either analog or digital. If it is digital, the amplified wave form values are sampled at a regular prescribed rate, typically 100,000–200,000 times per second, then digitized in the cartridge 21. They are then telemetered up the cable 20 as a sequence of binary numbers. If it is analog, the amplified wave forms are passed directly up the cable 20 and digitized in the surface equipment. The surface equipment typically includes a central processing unit 25, a tool/cable interface unit 26, a magnetic tape recording unit 27, an optical film recording unit 28, and a data bank 29 which may be a part of the central processing unit. The program executing in the central processing unit 25 is effective for issuing commands to the sonde 10 through the tool/cable interface unit 26 for selecting the transmitter and receiver combinations and for firing the transmitter. Typically, in the preferred embodiment, the transmitter 14, in the arrangement shown, is fired 12 times to provide a suite of 12 full wave signals. With the first firing of the transmitter 14, the receiver 15 is connected. For the tenth firing of the transmitter 14, the receiver 15n-2 is connected; for the 11th firing of the transmitter 14, the receiver 15n-1 is connected, and so on.

While only transmitter 14 has been illustrated, it may be desirable to utilize a second transmitter spaced from the transmitter 14 to provide borehole compensation in the manner described in U.S. Pat. No. 3,304,537 to R. J. Schwartz and entitled "Acoustic Logging Apparatus with Selectable Transmitters and Receivers." If that choice is made, then each suite of signals for a given depth level would include 12 firings of each transmitter and a total of 24 full wave forms transmitted to the surface from the receivers 15–15n.

The central processing unit 25 also retrieves the wave form, either from a telemetry module in the tool/cable interface unit 26, if digitization is done downhole, or from a digitizer module in the tool/cable interface if analog transmission is used. In either case, these wave form data are recorded using the magnetic tape recording unit 27.

The central processing unit 25 includes programs to process the received wave forms to produce the slowness time coherence (STC) data which are in the form of peak matrix signals in accordance with the aforementioned copending application of Kimball et al. The peak matrix signals are stored in data bank 29 to be recalled for further processing in accordance with the present invention. The further processing may be performed by the central processing unit 25 in the field. Optionally, the data stored in the bank 29 may be transferred to a central processing site. On the other hand, the full wave form data recorded on the magnetic tape unit 27 may be transferred to a central processing site where the peak matrices are produced and then utilized in the practice of the present invention to generate sonic logs representative of casing slowness, compressional slowness, shear slowness and Stoneley slowness.

The STC processing is fully described in the aforementioned pending application of Kimball et al, and the content thereof is incorporated herein by reference. Briefly, the procedure comprises the utilization of the central processing unit 25 or a similar computer programmed to find, for each relevant depth level z in the borehole 11, a respective coherence measure for the combinations of the time of arrival T of the sonic signal at the first receiver and the slowness S characterizing the travel of that signal from the transmitter to the receiver. The procedure is band limited so that only those combinations of T and S which are believed to be relevant are utilized in the process.

The moveout of a sonic pulse along the line of receivers can be linear with distance. Under this idealized condition, the time of arrival T at the receiver closest to the transmitter (separated from it by a distance $z_o$) will be proportional to the slowness at which that pulse travels, i.e.:

$$T = Sz_o \tag{1}$$

Figure 2:
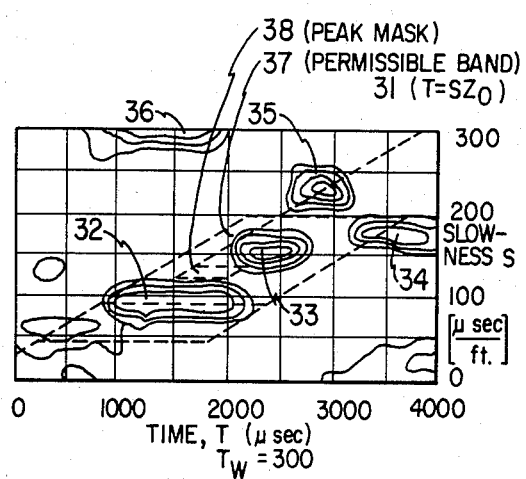
FIG. 2 is an example of a contour plot, in slowness versus time of arrival space, with a time window of 300 microseconds, showing the contours of equal coherence value derived from waveforms measured at a given borehole depth.
Figure 3A:
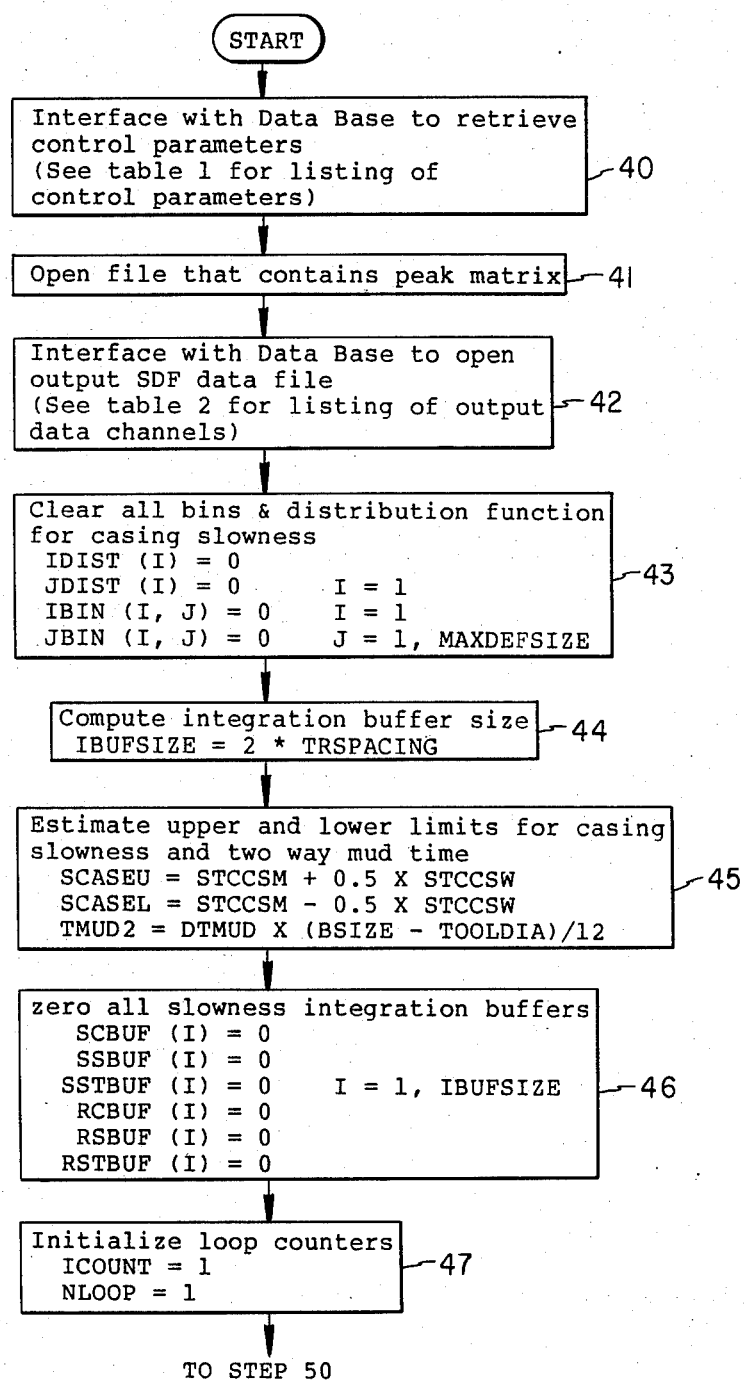
Figure 3B:
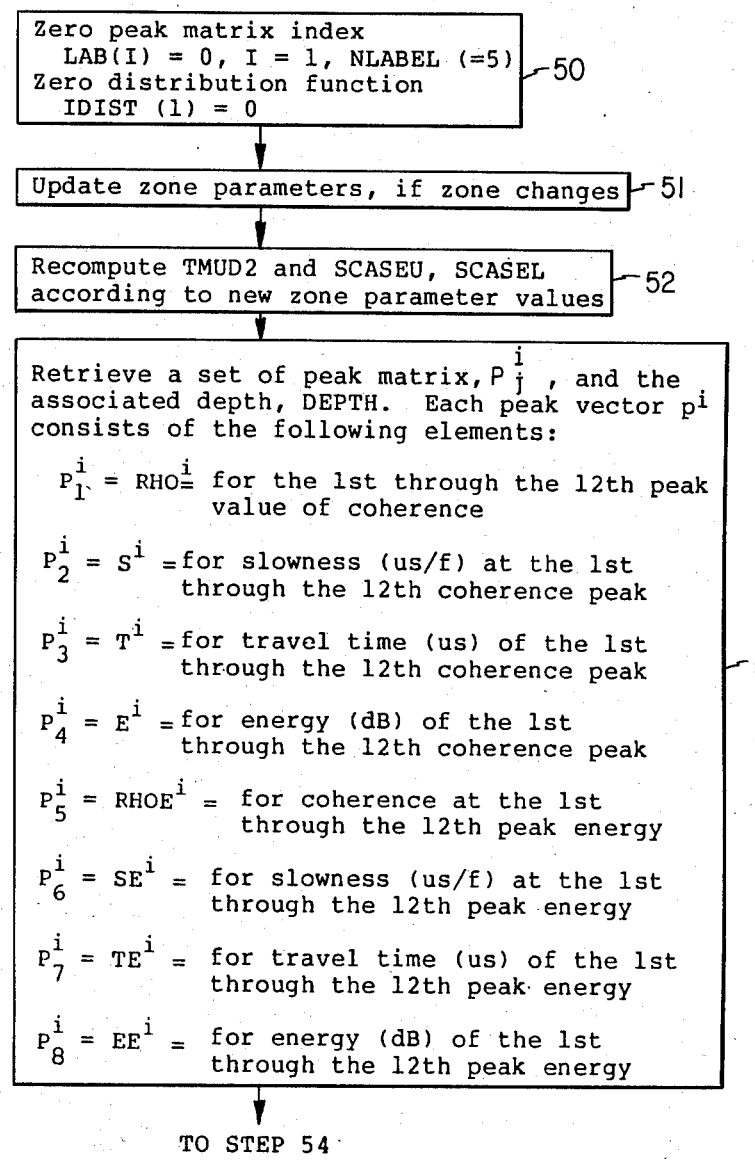
Figure 3C:
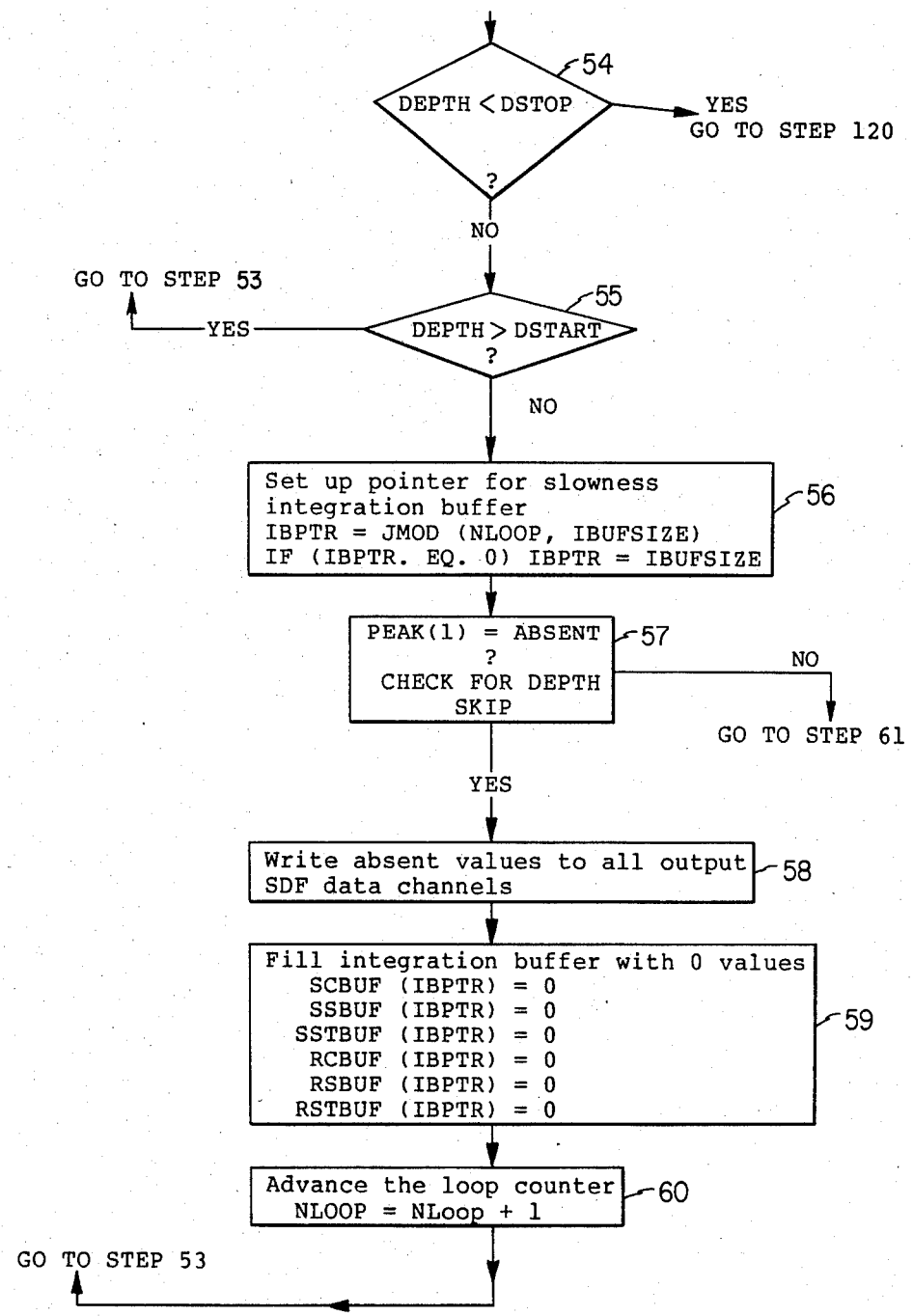

Expression (1) above describes a relation between time of arrival T and slowness S which can hold for an ideal homogeneous medium, and is illustrated graphically at 31 in FIG. 2. In many instances arrivals move out linearly across the string of receivers, yet do not obey this relationship exactly because of inhomogeneities between the transmitter and first receiver. Consequently, the time of arrival T and the slowness S can be only weakly dependent.

The responses of receivers 15 through 15n to a sonic signal from transmitter 14 are converted to a coherence measure based on the ratio of the coherent and total energies received thereby. Such a coherence measure of the response of a number of sonic receivers arranged as shown with respect to each other and with respect to the transmitter of the sonic signal is used in accordance with the STC method to provide a representation of the slowness of such waves as casing, compressional, shear and Stoneley. The coherence measure which has been found useful for the purpose is a measure of the presence of the arrival of a sonic signal at a specified starting time T and slowness S is the ratio of the coherent, or stacked, energy $E_c(T,S)$ and the total energy $E(T,D)$ received by sonic receivers 15 through 15n. The ratio is normalized to the number of sonic receivers M, which in the case discussed herein is twelve:

$$R^2(T,S) = \frac{1}{M} \frac{E_c(T,S)}{E(T,S)}$$

The coherent, or stacked, energy is the energy which is received in phase by the several sonic receivers when the spacing therebetween is accounted for.

It can be observed that for any given set of sonic waveforms from sonic receivers in the tool, the coherence measure level should be between zero and one, and that when it approaches one this indicates the presence of an arrival at time T and slowness S. A rule of thumb is that coherence levels greater than 2/M tend to indicate the presence of an arrival. In practicing the STC method levels of the coherence measure in excess of 0.9 have been commonly obtained.

For a given depth level in the borehole the coherence measures discussed above can be indicated on a map of coordinates in time T in microseconds and slowness S in microseconds/ft to give a plot of the general type illustrated in FIG. 2, where the contours represent isovalues of the coherence measure. It can be observed in FIG. 2 that four distinct ridges corresponding to four arrivals appear: a compressional arrival designated 32, two shear arrivals designated 33 and 34 and a Stoneley arrival designated 35. A half ridge is visible at 36 and is likely to be an alias of the compressional arrival.

The plot of FIG. 2 has been produced on the basis of a time window $T_w$ being set at 300 microseconds. If this time window is small (e.g., 10 microseconds) the coherent and total energies tend to vary sinusoidally at twice the frequency of an arrival at slowness D. This tends to lead to sinusoidal variations in the coherence measure derived on the basis of such a small time window and produces serrated ridge edges. Although the serrations resulting from choosing a small time window can contain some frequency information about the arrival, they also tend to confuse the plot and, consequently, the time window is usually selected so that it spans more than one cycle of the lowest frequency sinosoid expected. A time window of 500 microseconds has been found satisfactory over a variety of sonic logs.

While a contour plot such as that illustrated in FIG. 2 can be said to provide an accurate indication of the nature of the formation at the borehole depth level of interest, it can be inconvenient to show such a plot at each of tens of thousands of depth levels for a given borehole. For this and other reasons, the peaks in coherence (such as those indicated at 32, 33, 34 and 35) are found for each depth level of interest and new logs are produced based on parameters of such peaks.

At least two factors make peak finding nontrivial: small local variations in the coherence measure and aliases. In view of these factors, and for other reasons as well, such as the need to speed up the process, peaks are looked for only in a certain selected band of the time-slowness space, and a carefully selected definition of a peak is used. In addition, in accordance with the STC process aliases are countered by spacing the sonic receivers closely, for example half a foot or a foot from each other.

One technique of assuring that peaks in the coherence measure are likely to be properly located is to constrain their location in the slowness-time space to what has been discovered to be values of T and S which are reasonably likely to be relevant. Since the coherence measure need not be found for the (T,S) combinations which are not checked for peaks, this has the additional advantage of reducing the overall signal processing effort. As an example, the range of slowness can be restricted to bounds within arrivals which are commonly expected—e.g., values of 40 to 190 microsec/ft are suitable for locating compressional and shear arrivals, and values of 40 to 250 microsec/ft are suitable for locating fluid mode arrivals as well. In addition, the arrival times T for each slowness S can be limited to values discovered to be of likely relevance in practicing the STC process—for example, only times T for a given slowness at which a peak will be looked for can be limited to those between a minimum time and a maximum time.

The band in which peaks of the coherence measure are to be found is therefore limited to a line on T which is 1,500 microseconds wide and moves diagonally up and to the right in a plot such as that illustrated in FIG. 2. Such a line on T inscribes, as one example, the rhomboid 37 shown in broken lines in FIG. 2.

Once a coherence measure is found for each of the combinations of arrival time T and slowness S within the band in order to construct the equivalent of a map of the type illustrated in FIG. 2 for a given borehole depth level z, peaks in the coherence measure are looked for in a process which is optimized by successively looking for peaks in masks much smaller than the band 37 and by considering a coherence measure to be a peak if and only if it is greater than a selected minimum level and is greater than all other coherence measures within the mask. Such a peak mask is illustrated graphically at 38 in FIG. 2. The coherence value at a given point in a map such as that of FIG. 2 is selected as a peak only if it both exceeds a minimum value and exceeds the coherence measure at every other map point within the mask.

The threshold on coherence R can be taken as 2/M, where M is the number of sonic receivers on the tool. Peaks at points (T,S) on the map satisfying this definition are above the threshold and all their neighbors within the peak mask centered on the particular (T,S) point. Where in some instances points (T*,S*) within the peak mask are outside the band the coherence measure $R^2(T^*,S^*)$ for such point is taken to be zero.

Figure 8:
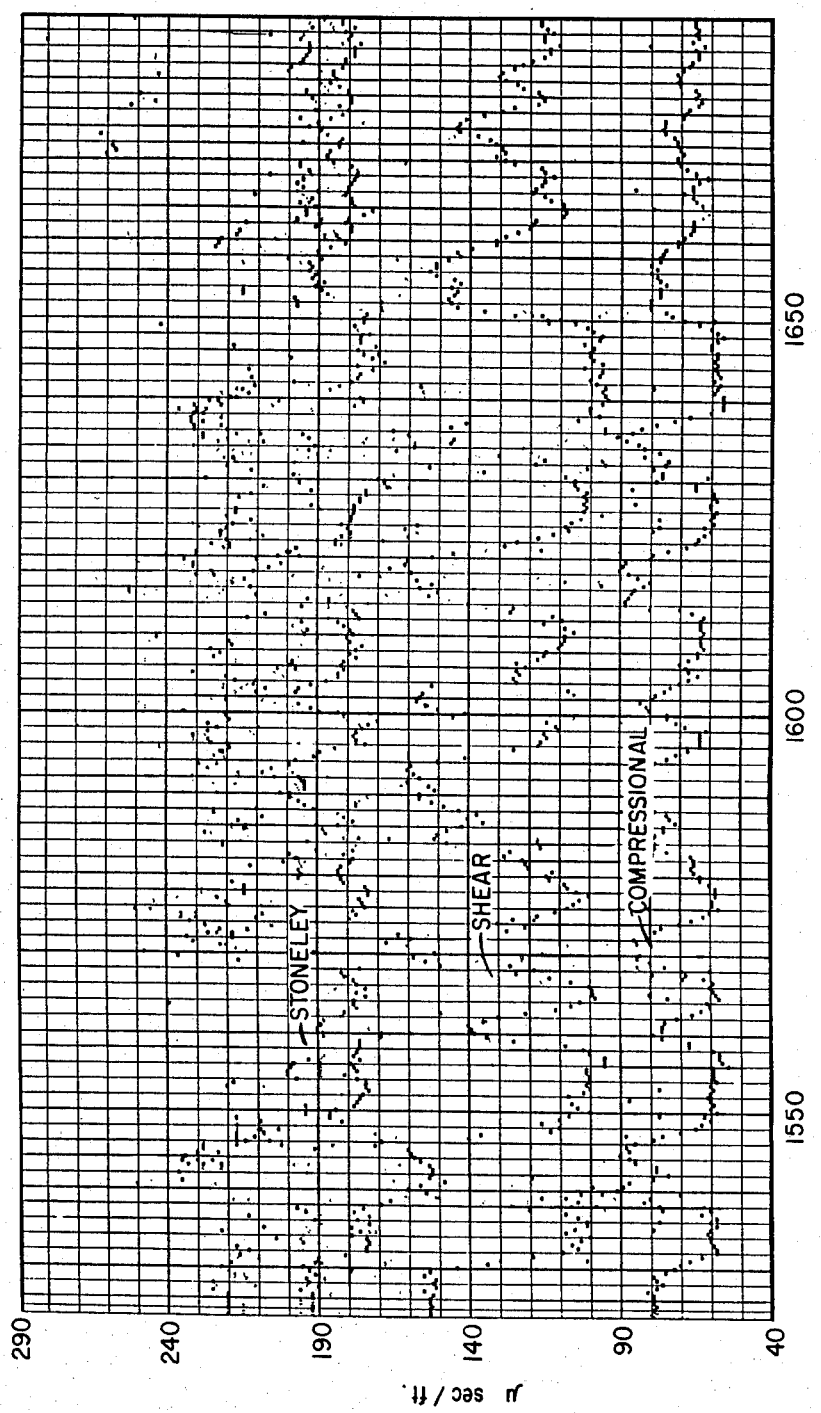
FIG. 8 is an example of the output of the slowness time coherence method.

The practice of the STC process results in the production of a log as shown in FIG. 8. The log referred to as a slowness/time coherence log with slowness in microseconds/ft as the ordinate and depth as the abscissa. Each illustrated point is representative of a coherence measure and is coded in shades of gray—the darker the tone, the greater the coherence.

One can immediately see that the log of FIG. 8 is difficult to interpret. While the compressional values of slowness may for the most part be readily ascertained as a function of depth, the task of interpretation becomes more difficult with regard to the shear wave data and almost impossible with respect to the Stoneley data.

Figure 9:
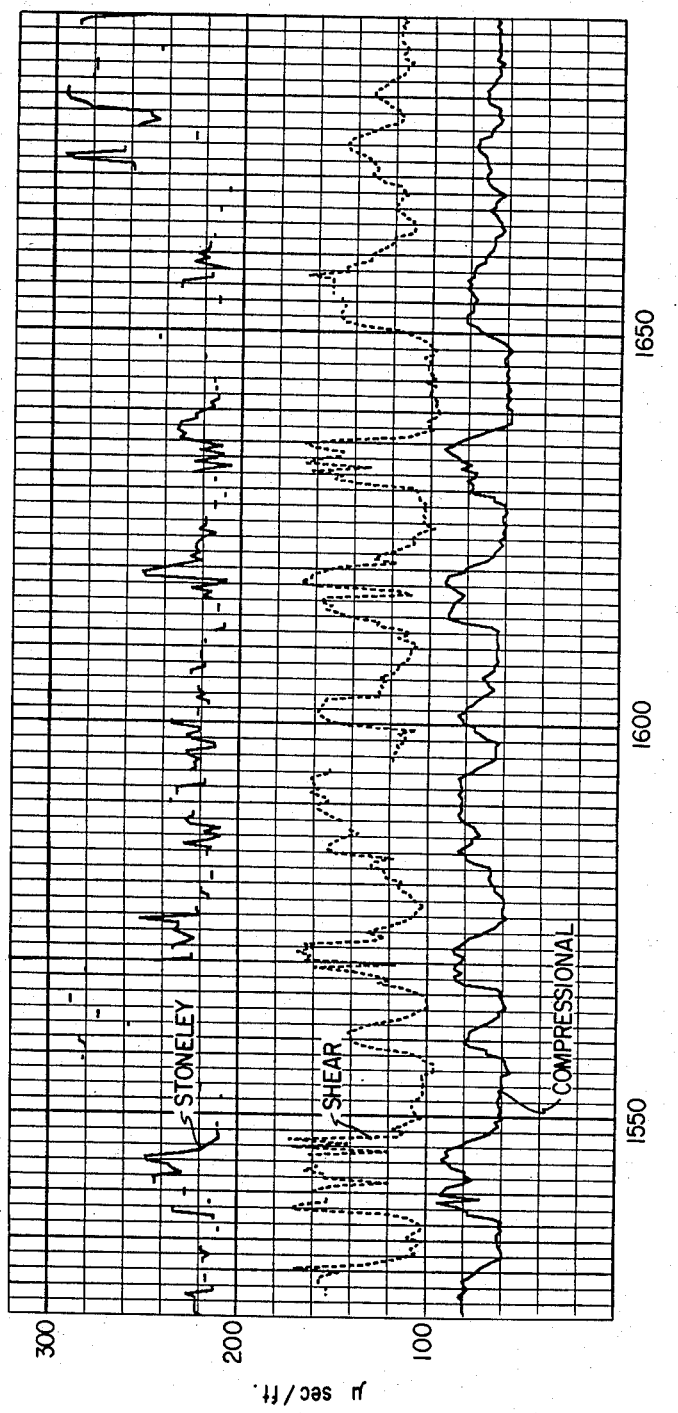
FIG. 9 is an example of a sonic log produced in accordance with the present invention, including separate curves for compressional, shear, and Stoneley wave forms.

Contrast the log of FIG. 8 with the log of FIG. 9 produced in accordance with the present invention, one can immediately see the improvement and the ease with which an interpretation may be had and values read regarding the slowness of compression, shear and Stoneley as a function of depth. Breaks appear in the trace of Stoneley slowness, but only because there was absent the presence of a valid Stoneley arrival and in such instance, the present invention caused the printout of a zero value, quite unlike the printout in FIG. 8 where many coherence values are printed for an alleged Stoneley arrival.

In accordance with the present invention, a matrix is established for each depth of interest, and having multiple vectors for each of the sought for wave arrivals. More specifically, each matrix is preferably comprised of eight peak vectors comprised of the maximum of peak coherence, the slowness at peak coherence, the time occurrence at peak coherence, coherent energy at peak coherence, coherent value at peak energy, the slowness at peak energy, the time occurrence at peak energy and the coherent energy at peak energy.

Among the criteria employed in searching the matrices accurately to determine wave arrivals are the following:

1. Casing arrival has a fairly constant slowness near 57 microseconds per foot.
2. Other than the casing arrival, the compressional wave is the first component in the wave train.

3. Given the compressional slowness, Sc, the range of shear slowness, Ss, is bounded by $1.3 \times Sc < Ss < 2.5 \times Sc$.

4. The Stoneley slowness is larger than that of shear slowness.

5. The Stoneley wave usually has the highest amplitudes in the wave train.

6. The slowness of a wave component should be consistent with the integrated arrival time. That is, the integration of the slowness at depth span between transmitter and receiver plus the mud time should be close to the wave component arrival time.

7. The STC processing is assumed to produce an average slowness of the formation spanned by the receiver array. Therefore, the upper and lower bound of the variation of slowness of a wave component between two successive depths is predictable.

The data inputs for the practice of the present invention is a set of peak vectors associated with each wave component. Each peak vector should contain the following elements:

1. An index indicating the maximum coherency of that wave component. For example, the maximum of coherence computed by the STC process or the maximum of array output of a phase array.

2. The time when that maximum of coherency occurs.

3. The slowness of propagation associated with that maximum coherency.

4. The energy associated with that maximum of coherency.

There are many methods that can produce the above peak vector from an array of wave forms sampled at different spatial locations, for example, the phase array processing algorithm, the auto-regressive-root method or the two dimensional Fourier transform method.

In the practice of the present invention, there is established at a depth of interest in the borehole a set of peak matrices comprised of peak vectors representative of the plurality of different characteristics of sonic signals traversing the earth formation. The above-described input values based upon borehole sonic characteristics are established and the matrices are searched in accordance with those values to identify the presence in the sonic signals of the selected wave components. The selected wave components are then recorded as a function of depth to produce logs of the type illustrated in FIG. 9.

The preferred mode for the practice of the present invention is illustrated in FIGS. 3 through 7 inclusive which depict detailed flow charts setting forth the steps to be followed to transform the STC data to logs of the type shown in FIG. 9. A digital computer is recommended for the practice of the present invention. A suitable digital computer is the VAX 11/780 available from Digital Equipment Corporation.

Referring now to FIGS. 3A–3D, there are set forth flow diagrams for initiating the program and otherwise conditioning the computer to carry out the search of the STC data to identify unique arrival times and slowness of the various wave components such as casing, compressional, shear and Stoneley. In step 40, the program interfaces the central processing unit 25 of FIG. 1 with a data base contained in the data bank 29 to retrieve control parameters such as those listed below in TABLE 1.

TABLE 1
LIST OF CONTROL PARAMETERS USED

| NAME | DEFINITION | DEFAULT VALUE |
|---|---|---|
| STCA. MOD | The labeling mode, either OPEN or CASED. This parameter is used to switch off or on the block of codes for the cased-hole logic in the algorithm. | OPEN — |
| DTMUD | The mud velocity used by the method. The method will search only Stoneley arrival only from those peaks with slowness higher than DTMUD. | 190.0 US |
| DTCMAX | The upper limit of the compressional slowness used by the method. This parameter is used to set up the upper limit of slowness search range for the compressional peak. | 130.0 US |
| DTCMIN | The lower limit of the compressional slowness used by the method. This parameter is used to set up the lower limit of the slowness search range for the compressional peak. | 38.0 US |
| DTSMAX | The upper limit of the shear wave slowness used by the method. This method is used to set up the upper limit of slowness search range for the shear peak. | 190.0 US |
| DTSMIN | The lower limit of the shear wave slowness used by the method. This parameter is used to set up the lower limit of slowness search range for the shear peak. | 54.0 US |
| DTSTMA | The upper limit of the Stoneley slowness used by the method. This parameter is used to set up the upper limit of slowness search range for the Stoneley peak. | 400.0 US |
| DTSTMI | The lower limit of the Stoneley slowness used by the method. This parameter is used to set up the lower limit of slowness search range for the Stoneley peak. | 190.0 US |
| VARIDX.CMP | The variability index of the formation for compressional wave used by the method. | 5.0 — |
| VARIDX.SHE | The variability index of the formation for shear wave used by the method. | 5.0 — |
| VARIDX.STO | The variability index of the formation for Stoneley wave used by the method. VARIDX ranges from 0 to 10. The higher value of this parameter is for higher degree of lamination of the formation. The method will dynamically adjust the search range in slowness according to this parameter. For higher laminated formations, the search range will grow or shrink more rapidly than the less laminated cases when the explainability of the data decrease or increase. | 5.0 — |
| STCCAT | The allowable variation range of differential time, Tdca, between the casing wave energy peak and the estimated casing arrival time (between | 100.0 US |

TABLE 1-continued
LIST OF CONTROL PARAMETERS USED

| NAME | DEFINITION | DEFAULT VALUE |
|---|---|---|
| | the transmitter and the first receiver). Tdca is computed by the following formula: Tdca = Tca − Tfltrdl − Sca* TRS − Tmud2 where Tca is the time of casing energy peak, Tfltrol is filter delay, Sca is the casing slowness, TRS is the transmitter-receiver spacing, and Tmud2 is the two way mud time with propagation path perpendicular to the borehole wall | |
| TBCA | The time bias to be placed on the casing time. The time, Tca, of the casing energy peak should be in the following range: TBCA − STCCAT < Tdca < TBC + STCCAT | 0.0 US |
| STCCT | The allowable variation range of the differential time, Tdc, between the compressional energy peak and the estimated compressional arrival time (between the transmitter and the first receiver). Tdc is computed by the following formula: Tdc = Tc − Tfltrdl − Tcint − Tmud2 where Tc is the time of compressional energy peak, Tfltrdl is filter delay, Tcint is the integrated comp. time over the distance between the transmitter and receiver and Tmud2 is the two way mud time with the propagation path perpendicular to the borehole wall. | 200.0 US |
| TBC | The time bias to be placed on the compressional time. The time Tc, of the compressional energy peak should be in the following range: TBC − STCCT − CF < Tdc < TBC + STCCT + CF where CF is the compressional time relaxation factor which is proportional to the number of past bad data points in the integration buffer. CF is computed internally by the STC2 program. | 0.0 US |
| STCSHT | The allowable variation range of differential time, Tds, between the shear wave energy peak and the estimated shear arrival time (between the transmitter and the first receiver). Tds is computed by the following formula: Tds = Ts − Tfltrdl − Tsint − Tmud2 where Ts is the time of shear energy peak, Tfltrdl is filter delay, Tsint is the integrated shear time over the distance between the transmitter and receiver and Tmud2 is the two way mud time with the propagation path perpendicular to the borehole wall. | 350.0 US |
| TBS | The time bias to be placed on the shear time. The time, Ts, of the shear wave energy peak should be in the following range: TBS − STCSJT − SF < Tds < TBS + STCSHT + SF where SF is the shear wave time relaxation factor which is proportional to the number of past bad data points in the integration buffer. SF is computed internally by the STC2 program. | 0.0 US |
| STCSTT | The allowable variance of the differential time, Tdst, between the Stoneley wave energy peak and the estimated Stoneley arrival time (between the transmitter and the first receiver). Tdst is computed by the following formula: Tdst = Tst − Tfltrdl − Tstint where Tst it the time of shear energy peak, Tfltrdl is filter delay, Tstint is the integrated Stoneley time over the distance between the transmitter and receiver. | 500.0 US |
| TBST | The time bias to be placed on the Stoneley time. The time, Tst, of the Stoneley wave energy peak should be in the following range: TBST − STCSTT − STF < Tdst < TBST + STCSTT + STF where STF is the shear wave time relaxation factor which is proportional to the number of past bad data points in the integration buffer. STF is computed internally by the STC2 program. | 0.0 US |
| NREC | The number of receivers in the array. This parameter is used by the LABEL program to set up various data buffers. The STC2 program will write the value to this JPT parameter so that LABEL can read it for labeling the peak in the post processor mode. | 8 — |
| TFLTRDL | The time (us) of filter delay. For example, if the filter file has 65 coefficients and the effective sampling interval is 10 us (real sampling rate of 20 us and STCN.EXP = 2 interpretation), then the filter delay will be TFLTRDL = (no. of coef.)*(sampling interval)/2 = 65*10/2 = 325 us. This parameter is for use by LABEL program to discriminate the arrival peaks in time domain. STC2 program will write the value into the JPT to be read by LABEL program for further processing. | — US |
| CSDFS | Casing slowness distribution function population size | 20 — |
| STCCDM | Casing slowness distribution function minimum value | 8 — |
| STCCSM | Casing slowness mean value | 57 — |
| STCCSW | The width of the casing slowness range (centered at | 4 US/F |

TABLE 1-continued
LIST OF CONTROL PARAMETERS USED

| NAME | DEFINITION | DEFAULT VALUE |
|---|---|---|
| | the mean value) | |

In step 41 there is opened the file containing a peak matrix and in step 42 the program interfaces with the Data Base to open up the output file having output data channels identified below in Table 2.

TABLE 2
LIST OF OUTPUT DATA CHANNELS

| | |
|---|---|
| PR | for the Poisson's ratio |
| DTCASE | for casing delta-t (currently not used, i.e. filled with absent values) |
| DT | for compressional delta-t |
| DTSM | for shear delta-t |
| DTFLD | for mud delta-t (currently not used, i.e. filled with absent values) |
| DTST | for Stoneley delta-t |
| RMSC | for the ratio of shear to compressional delta-t |
| COHC | for the coherence value at the compressional peak |
| COHS | for the coherence value at the shear peak |
| COST | for the coherence value at the Stoneley peak |
| TDC | for the time deviation from the integrated compressional time (slowness-time line) for compressional peak |
| TDSH | for the time deviation from the integrated shear time (slowness-time line) for shear peak |
| TDST | for the time deviation from the integrated Stoneley time (slowness-time line) for Stoneley peak |
| CHE | for the compressional coherent energy by STC |
| SHE | for the shear coherent energy by STC |
| STE | for the Stoneley coherent energy by STC |

Step 43 clears all the bins associated with distribution function for casing slowness.

Step 44 computes the integration buffer size. The integration is performed to obtain the arrival time estimation. To do so it is necessary to integrate all the delta-t's between the transmitter and the receivers. Therefore the buffer required is one large enough to contain all the delta-t between the transmitter and the receivers. Specifically, because sampling is every half a foot, the buffer size is twice the transmitter to receiver spacing in feet.

In step 45 there is estimated the upper and lower limits for casing slowness and two way mud time. The casing slowness upper and lower limit is computer based on the user input satisfied by establishing the mean variable of casing slowness. The mud time is required. It effects the total time since the sonic signal starts at the transmitter in the center of the borehole, goes through the mud column, refracts through the formation and passes through the mud column again to a receiver. Since the integration only takes care of the travel time in the formation, travel time through the mud must be added to make the total integration as correct as possible. It's a small correction, but nevertheless it should be made. Step 46 zeros all the integration buffers. These include the compressional slowness buffer SCBUF, the shear slowness buffer SSBUF, the Stoneley slowness buffer SSTBUF, the compressional coherence buffer RCBUF, the shear coherence buffer RSBUF and the Stoneley coherence buffer RSTBUF. The loop counter is initialized in step 47. Step 50 is a peak matrix index called LAB. There are five of them. The first one is for casing, the second one is for compression, the third one is for shear, the fourth one is for mud, and the fifth one is for Stoneley. In step 50 there is also zeroed the distribution function for casing slowness.

Step 51 calls for an update parameters. This step is performed to take into consideration that some of the parameters initially obtained from the data base may need to be changed as logging proceeds through different zones. If the parameter such as mud travel time TMUD needs to be changed, the computer will detect it and will change the parameter. If a parameter is changed then step 52 recomputes mud travel time TMUD2 and the upper limit of casing slowness SCASEU as well as the lower limit of casing slowness SCASEL. Step 53 retrieves a set of peak matrices. These peak matrices contain x number of peak vectors. Each peak vector has 8 elements, the first one is the coherent value (RHO), the second one is slowness (S), the third one is the time (T), the fourth one is the energy (E), the fifth one is the coherent value at peak energy (RHOE), the sixth one is the slowness at peak energy (SE), the seventh one is the time at peak energy (TE), and the eighth one is the energy at peak energy (EE).

Step 54 examines whether the processing has reached the stop depth at which computation is to cease. If yes, the program goes to exit step 120. If no, the process continues. Step 55 asks whether the depth of the selected data at the depth processing is to begin is equal to the start depth. If it is yes, the process continues by returning to step 53 to read another set of data to be processed. The first set of data at DSTART is not processed. Thereafter depth will be less than DSTART since logging is up hole and DEPTH continues to decrease.

In step 56 a pointer is set up for the slowness integration buffer which is fixed; it will repeatedly be used in a rotating fashion. Step 57 checks to see whether the selected peak matrix contains absent values. Absent values really mean that the entire peak matrix set is invalid in the sense that there is a depth skip. A peak matrix at that depth is simply filling in some special value signifying that at this depth there is no data and therefore it is skipped.

The absent values are written to all output channels in step 58, when the program detects that the peak matrix at the selected depth is invalid. Specifically, the integration buffer is filled with 0 values in step 59 to represent in the buffer that the peak matrix is invalid. In step 60 the loop counter is updated by 1 and the program returns to step 53 to read another set of peak matrix. On the other hand should the peak matrix examined in step 57 be valid, the program moves to step 61 to start processing the data. In step 61, distribution function buffer pointer is set up. The pointers for the locations to store the current and the next casing slowness in the buffers are computed here.

Figure 4:
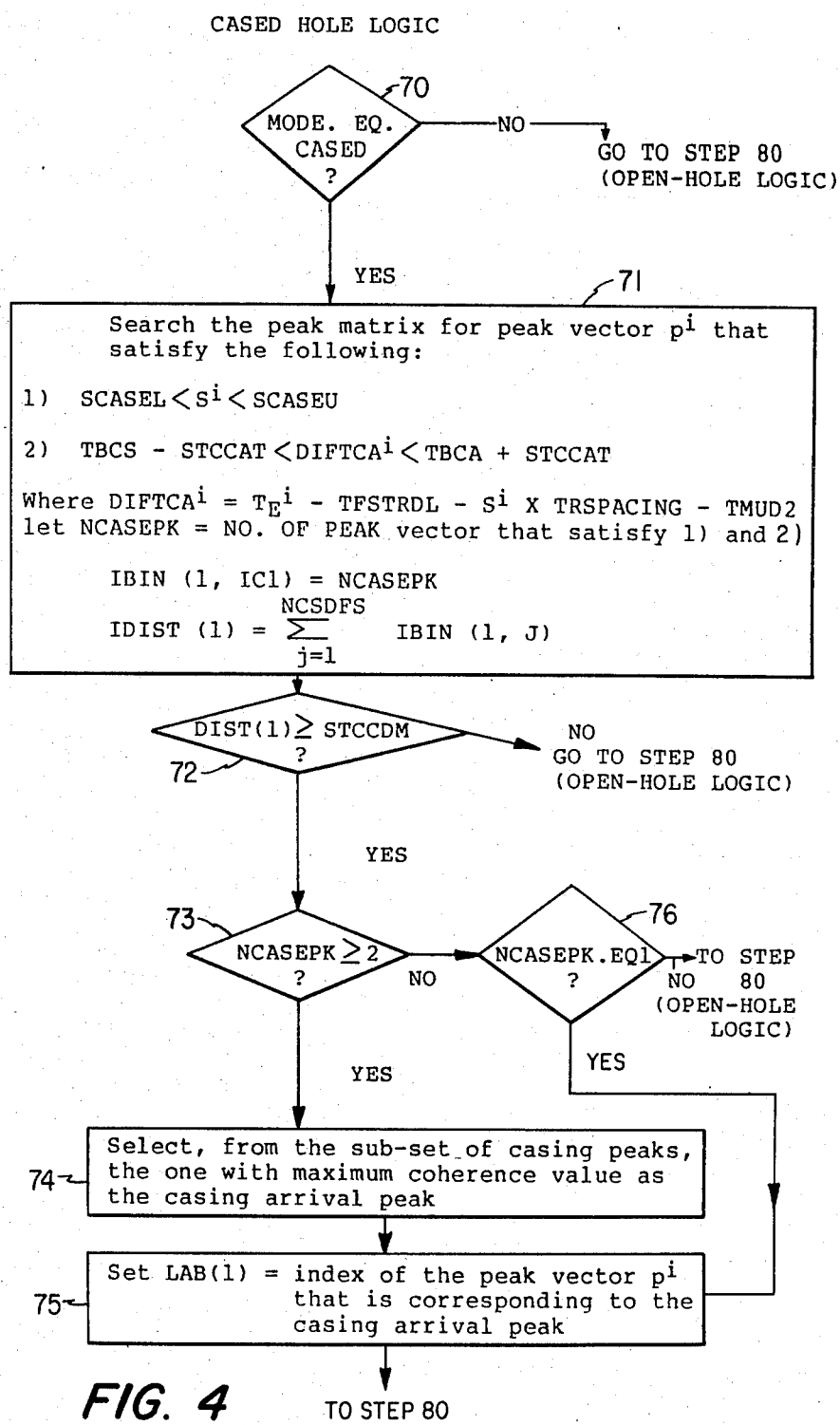
FIG. 4 is a detailed flow diagram illustrating the steps taken in accordance with the present invention to identify the casing wave arrival.

Referring now to FIG. 4 which illustrates the cased hole flow chart. The first step 70 asks whether this data set was derived in the environment of a cased hole. If it is no, then the program moves to open-hole logic. If it is cased-hole data, step 71 will search the peak matrix for casing peaks. In step 71 all the peaks are screened initially with two criteria. One is if one or more peaks fit the upper and lower limit criterion of casing slowness. Second is that one or more peaks fit the consistency criterion of time. If both of these criteria are satisfied, the total number of peaks satisfying the criteria are assigned to a bin from which there can be computed the distribution function. Step 72 asks, is the magnitude of the distribution function larger than some minimum acceptable value? If it is no this means that the program moves to open-hole logic to look for a compression arrival. If the distribution function is larger than some minimum acceptable value, the program determines in step 73 the number of casing signals at that particular depth, and therefore the number of peaks which satisfy the two criteria. If there are two peaks, one of the two is to be selected. If there is but one peak, then that one is identified as casing signal arrival.

If the answer at step 73 is "no," the program moves to step 76. If it is "yes," there is selected in step 74 the peak with the maximum coherent value as the casing peak At step 75 the index for the casing peak LAB(1), is set to equal the index of the peak matrix of that particular depth. The program then proceeds to open hole logic, step 80.

Figure 5A:
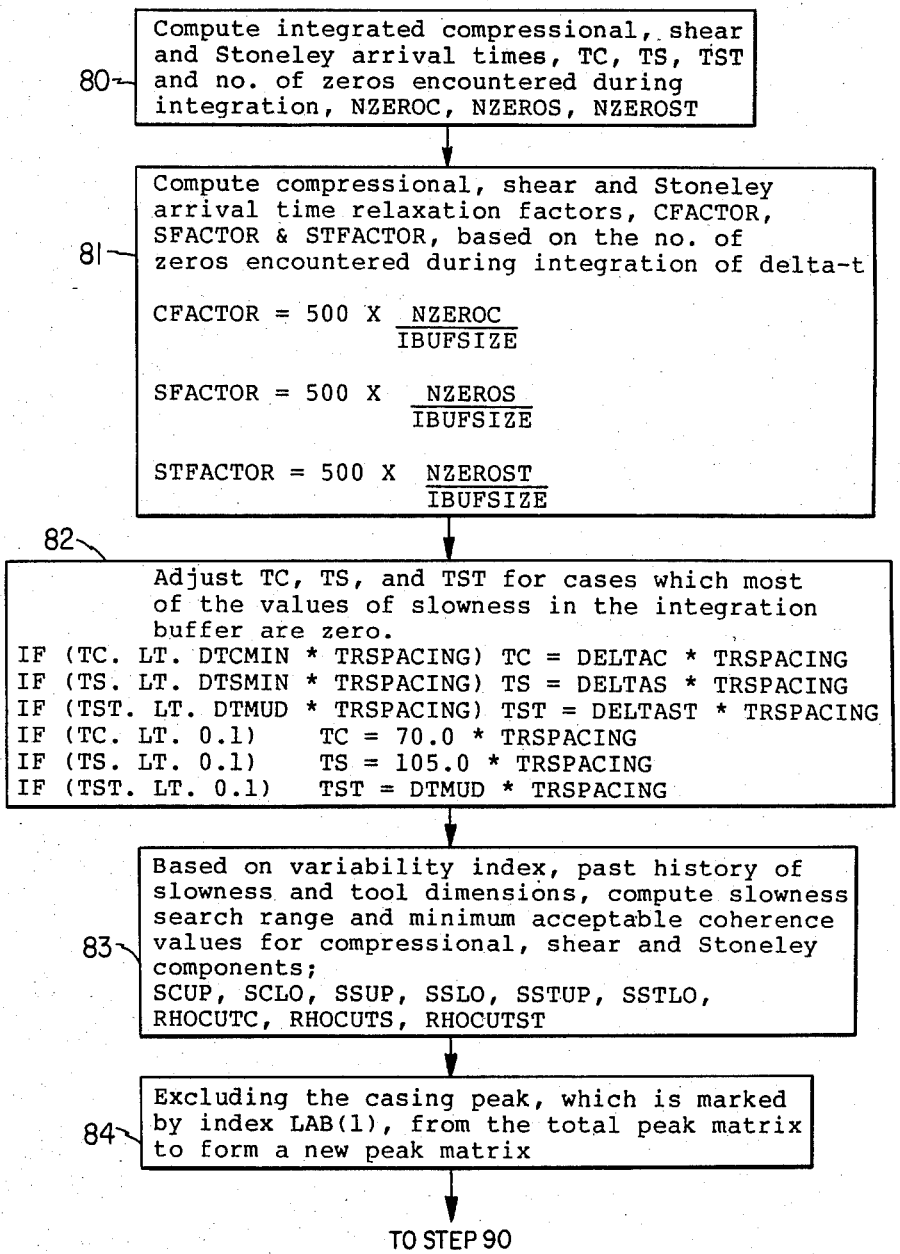
FIGS. 5A, 5B and 5C are detailed flow diagrams illustrating the steps to be carried out in accordance with the present invention to identify the compressional wave arrival.
Figure 5B:
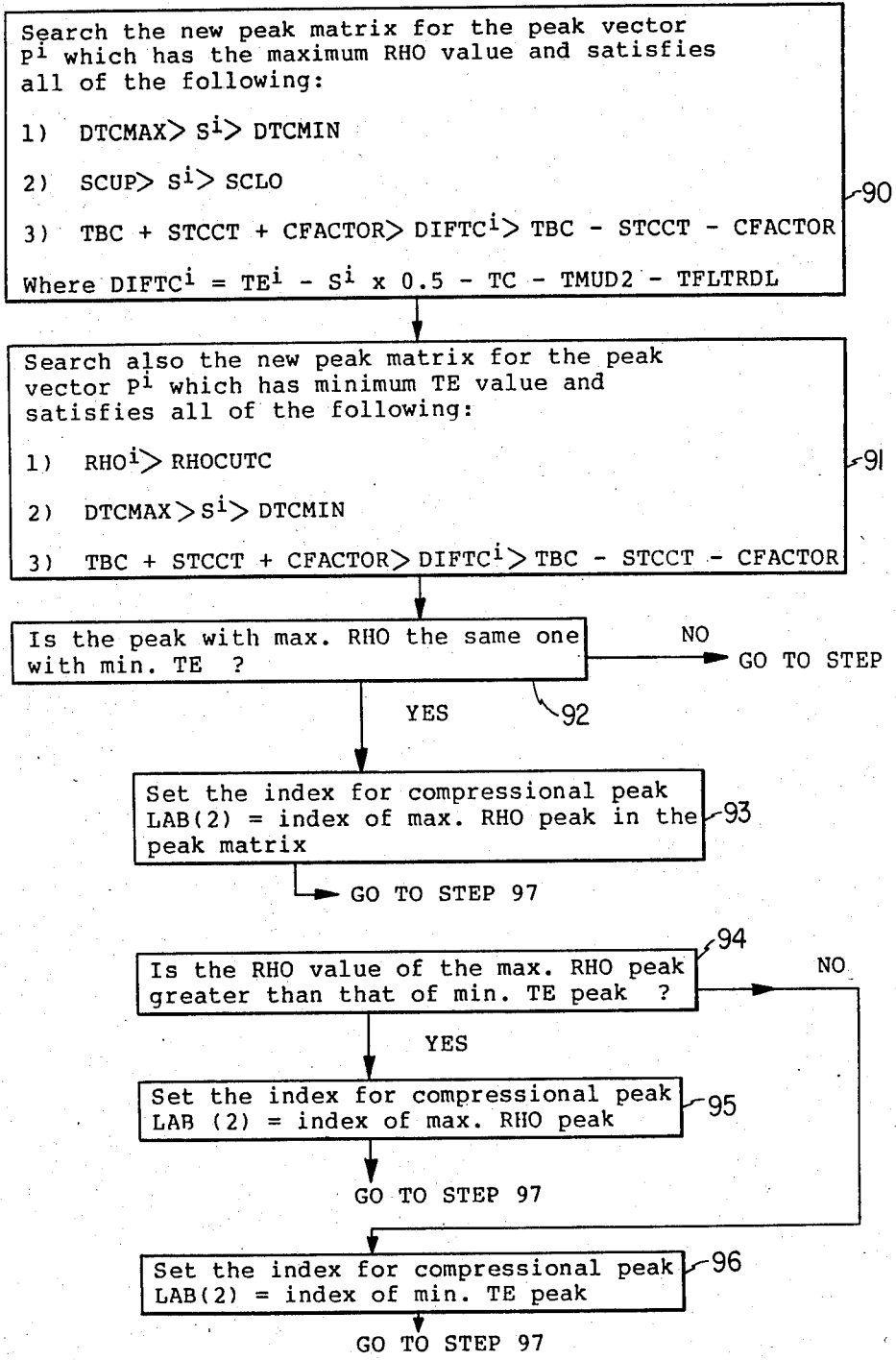
Figure 5C:
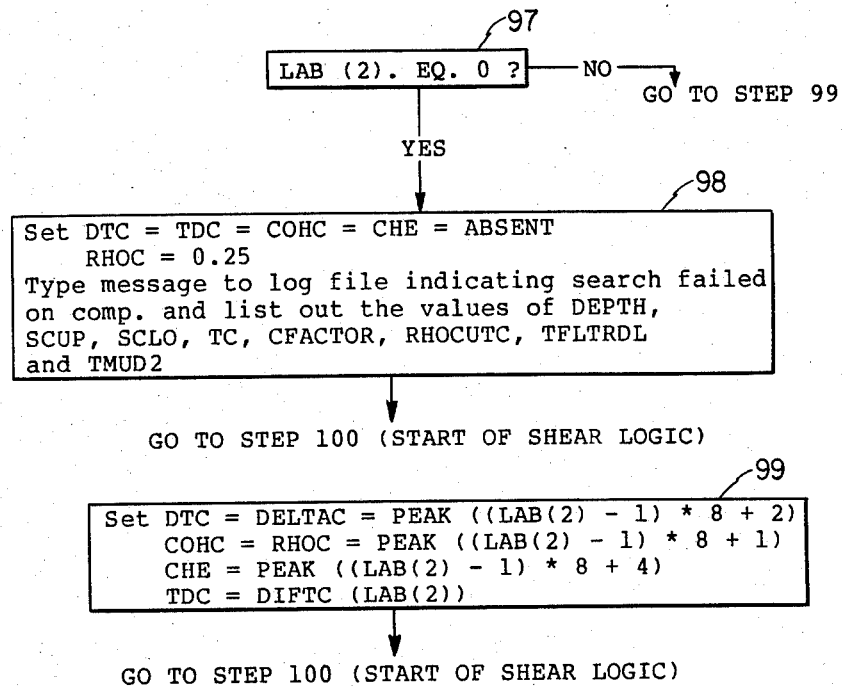
Figure 6A:
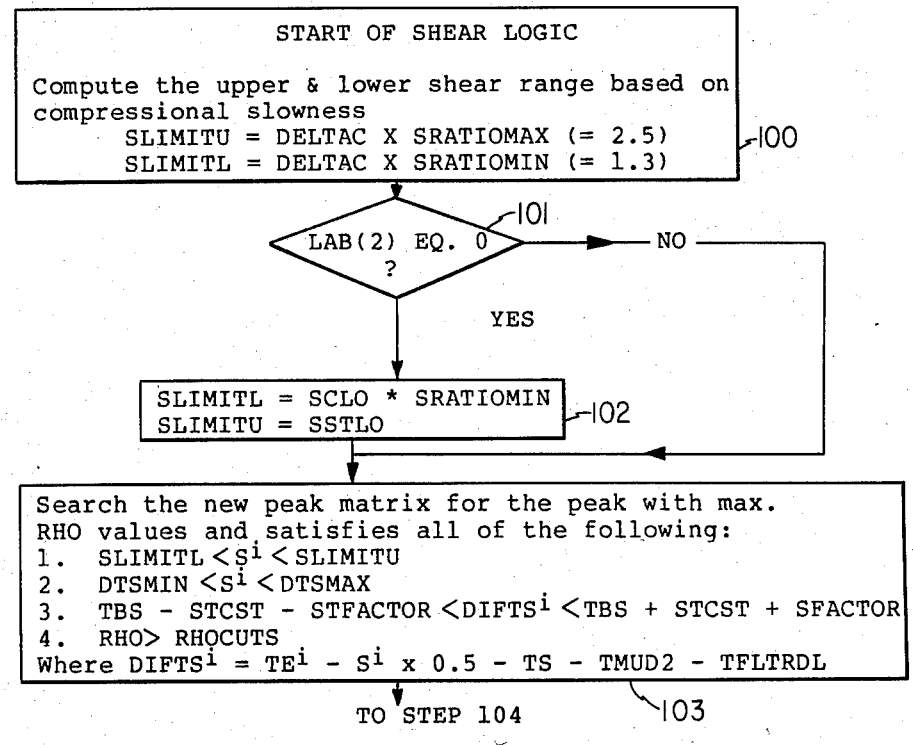
FIGS. 6A and 6B are detailed flow diagrams illustrating the steps to be carried out in accordance with the present invention to identify the shear wave arrival.
Figure 6B:
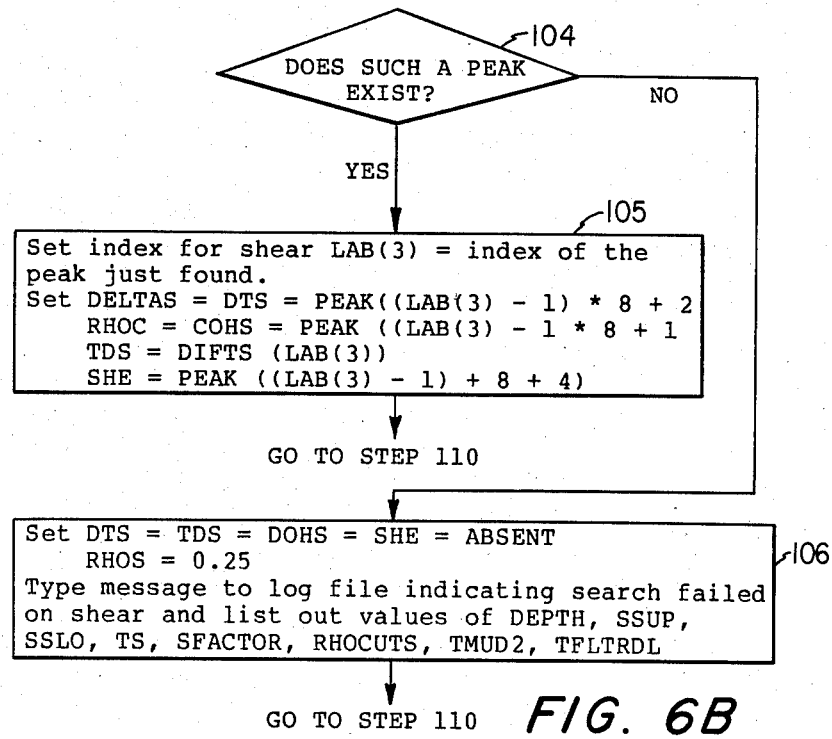
Figure 7A:
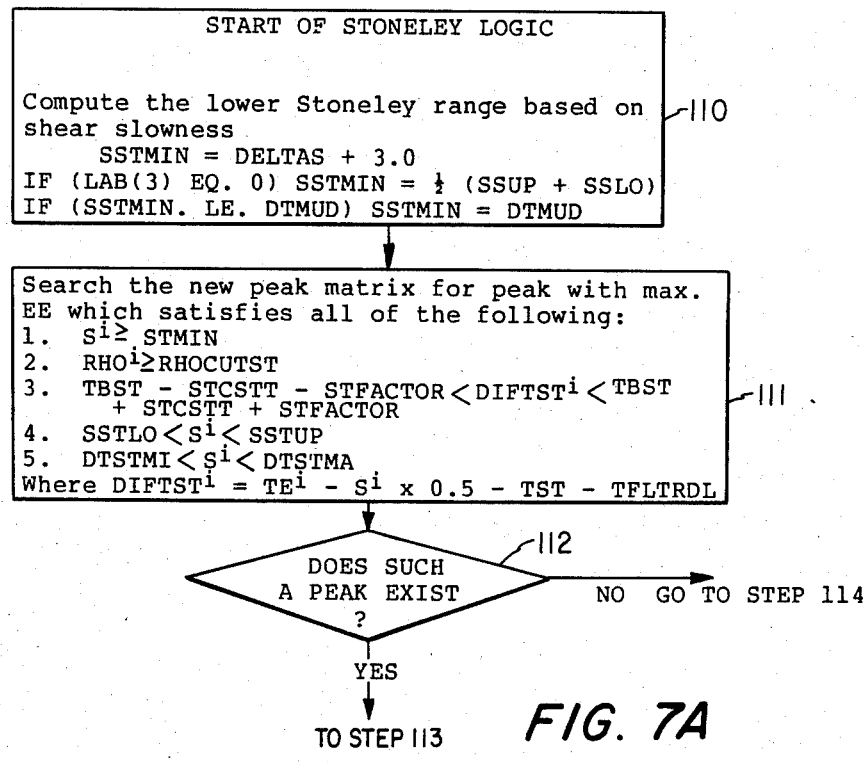
FIGS. 7A and 7B are detailed flow diagrams illustrating the steps to be taken in accordance with the present invention to identify the Stoneley wave arrival.
Figure 7B:
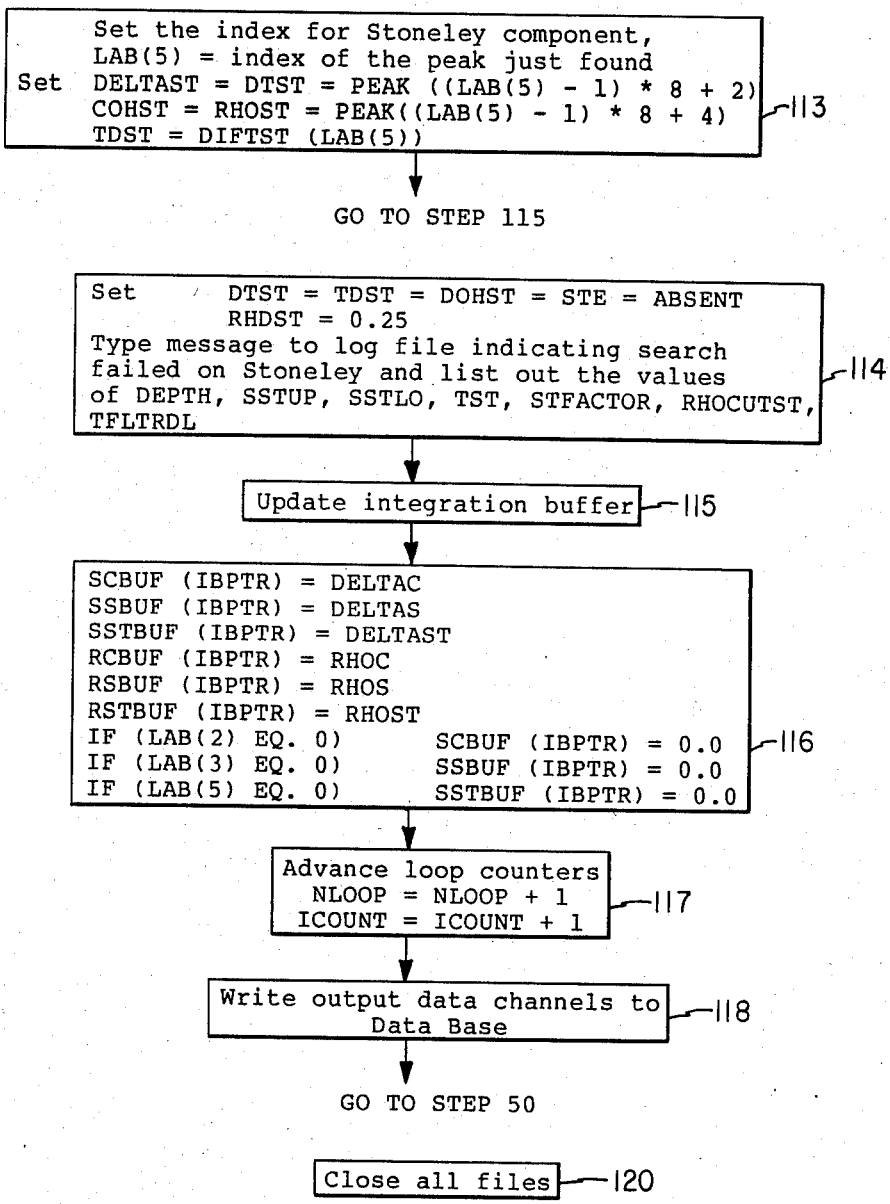

Referring now to FIGS. 5A, 5B & 5C which illustrate the steps comprising open hole logic, step 80, which is the start of the open hole logic, provides a set up stage, a sub routine, which computes integrated compres-. sional, shear and Stoneley arrival times, respectively TC.,TS, TST and the number of zeros encountered during integration, referred to as NZEROC, NZEROS, and NZEROST respectively for compression, shear and Stoneley. Step 81 computes a relaxation factor associated with the time check of step 8. If there are a large number of zeros in the integration buffer, it means that the data is invalid there, and the time check must be relaxed by computation carried out in step 81. The compressional relaxation factor is CFACTOR, the shear relaxation factor is SFACTOR and the Stoneley relaxation factor is STFACTOR.

Step 82 includes a block of code used to adjust for the condition where the TC, TS and TST are of such values that most of the integration buffers have zero value. Absent step 82, the integration time would equal zero. The procedure is to check whether any of the times are less than some minimum acceptable value. If they are less than these minimum values, the times will be reset to a more acceptable value. Step 83 includes a sub routine utilizing a user input value called a variability index for compressional, shear and Stoneley, as well as the past history of slowness. Based on the two dimensions there is computed in step 83 the slowness search range. The search range has an upper and lower limit labeled SCUP, SSLO, respectively for slowness compressional upper limit, slowness compressional lower limit. SSUP and SSLO are labels respectively for slowness shear upper limit and slowness shear lower limit. SSTUP and SSTLO are labels respectively for slowness Stoneley upper limit and slowness Stoneley lower limit. There are three minimum acceptable values established for coherence called RHOCUTC, RHOCUTS, and RHOCUTST respectively for compression, shear and Stoneley.

Step 84 excludes the casing peak LAB(1) from the total peak matrix to form a new peak matrix in preparation for steps leading to the identification of the compressional arrival. The search for compressional begins with step 90 based upon one set of criteria and continues with step 91 based upon another set of criteria. The first search is carried out by step 90 where there are sought peaks that satisfy the criteria that the compressional slowness is between some maximum and minimum value of delta-t which is set by user. Normally it is 40–150 microseconds/ft. The search also seeks a slowness that fits the upper and lower limit computed in step 83. The third criterion is that the time has to be consistent with slowness. Sought for are peaks that satisfy all three of the criteria and from among them to pick the one that has the maximum coherent value.

The second search is carried out by step 91, based upon three criteria. One criterion is that the coherent value RHO is bigger than some minimum acceptable value. A second criterion is that delta-t has to be within some maximum and minimum value set by user. Again, that's in the range of 40–150. A third criterion is that the time has to be consistent with its slowness. Sought are peaks that satisfy all the three of these criteria and from among them is selected the one that has the minimum time at the peak energy.

In step 92 there is determined which of the two peaks selected in steps 90 and 91 is the compressional peak. If the result of the search in step 91 is the same as the search in step 90, the peak with maximum coherent value is the same as the one with minimum time at peak energy. There is now no question but that this peak is the compressional peak. In step 93 there is set an index LAB(2) equal to the index of this maximum compressional peak. If the answer in step 92 is no, then the program moves to step 94.

In step 94 there is determined which one of the two peaks is the compressional peak. The coherent value of the maximum coherent peak is compared with the coherent value of the minimum time peak. If the maximum coherent peak is greater in coherent value than the coherent value of the minimum time peak, the index of the compressional peak is set equal to the index of maximum coherent peak as performed in step 95. If the reverse is true, step 96 sets the index for compressional peak, LAB(2), equal to the minimum time peak.

Step 97 determines whether indeed a compressional peak is present. In either event an output is generated. If LAB(2) is equal to 0 there is no compressional peak and as a result, absent values are set in step 98 for (DTC) delta-t compressional, (TDC) the differential time for compressional, COHC the coherent value for compressional, and CHE the compressional coherent energy. In addition, there is typed a message to the log file indicating that the search failed on compressional and listing out those parameters related to the search so that a record is had of why the search failed. Output values are established in step 99 and in the event the presence of a compressional peak is verified in step 97, TC is set equal to the second component of that peak factor which is slowness, the coherent value COHC is set equal to the first component of that peak and coherent energy CHE is set to the fourth component of the peak factor. There is also recorded the differential time TDC.

Shear logic begins with step 100 where there is initially determined an upper and lower limit of search range. It is computed by multiplying the previously determined compressional delta-t by factors; the upper factor is 2.5, the lower factor is 1.3. If the compressional peak has not been found, namely LAB(2) equals 0, step 101 will cause a computation in step 102 utilizing the index previously determined in step 95. If a compressional exists, that is, the answer in step 101 is "no," step 102 is bypassed.

Step 103 will start the search for a shear peak. The search has four criteria. Sought for are the peaks that satisfy all four of the criteria, and which also have maximum coherence. The first criterion is that the slowness value has to be within the maximum and minimum range set by step 100 or step 102. Second, the slowness also has to be within the maximum and minimum range set by user. This gives the user control to change the limit. Third is the time consistency with the slowness check. The fourth criterion is that the coherent values are larger than some minimum acceptable value. If such a peak or peaks as determined in step 104 exist, then in step 105 are set up the delta-t S equal to the second component of that peak vector, a coherent value ROHC equal to the first component, and also set up the coherent energy for shear, SHE, equal to the fourth component of the peak vector. If such a peak does not exist the differential time TDS is also recorded. If a peak does not exist as determined in step 104, the program moves to step 106 which sets all previously mentioned parameters to an absent value and also sends a message to the log file stating that shear could not be found together with the values used in the search.

The Stoneley logic begins with step 110 in which there is first computed a lower range for Stoneley slowness. The computation is performed by adding some fixed value, for example 3.0 microseconds per foot, to the shear slowness obtained at that depth. But if LAB(3) equals to 0., i.e. shear was not found in the previous stage, then the Stoneley slowness minimum value is computed in step 110 by adding shear upper limit to shear lower limit and dividing by two. If this value is less than DTMUD then there is utilized DTMUD as the minimum value for Stoneley slowness SSTMIN.

Step 111 conducts a search for Stoneley, utilizing five (5) criteria. The peaks sought must satisfy all five (5) criteria and have maximum energy. The first criterion is that Stoneley slowness has to exceed the minimum value computed in step 110. A second is that the coherent value has to exceed some minimum acceptable value. A third criterion is that the time should be consistent with slowness. The fourth criterion is that the slowness again has to fit between some upper and lower limit computed by the rate of change based on past history. The fifth criterion is that the slowness lies between some upper and lower limit set by user. This fifth criterion provides user control. If such a peak exists as determined in step 112, there is set in step 113 an index LAB(5) equal to the index of that peak, and a value of Stoneley slowness DELTAST is set equal to the second component of that peak factor. The coherent value COHST is set equal to the fourth component of that peak factor. The differential time TDST is also recorded.

If such a peak does not exist, the program moves to step 114 which sets all previously mentioned parameters to an absent value and sends a message to the log file that Stoneley could not be found together with the values used in search.

At step 115 the program instructs an update of the integration buffer in step 116 with the values just determined for casing, compressional, shear, and Stoneley slowness. If those peaks do not exist, 0 values are placed in the integration buffer as per the last three statements in step 116.

Step 117 advances the loop counter by 1 and step 118 writes out all the values from step 116 to the output file via the Data Base. After the data is written to the output file, the program returns to step 50 to restart the search cycle. The search continues as above described until the actual depth of data becomes less than the stop depth DSTOP of step 54 whereupon the program moves to step 120 to close all files and prepares to exit the program.

Now that the invention has been described, variations and modifications will occur to those skilled in the art. It is intended that such variations and modifications be encompassed within the scope of the appended claims.

What is claimed is:

1. A method of sonic logging comprising the steps of:
    establishing at a depth of interest in a borehole a set of peak matrices comprised of peak vectors representative of a plurality of different characteristics of sonic signals traversing an earth formation,
    establishing a set of rules based upon borehole sonic characteristics and including the utilization of past histories of slowness and coherence values of wave components of interest,
    searching said matrices in accordance with said rules to identify the presence in said sonic signals of wave components of interest,
    recording those identified wave components as a function of the depth of interest, and
    repeating said steps at each depth of interest; in which said peak vectors include the characteristics of the maximum of peak coherence and the energy associated with the maximum of peak coherence for each wave component and the wave components include a compressional component, a shear wave component a casing peak and a Stoneley wave compohent;
    and further in which a casing peak is identified by counting over a given number of waveform sets the number of peaks with slowness within a given slowness range and whose arrival times are within a predetermined amount of the integrated casing time and having a coherence value greater than a given coherence cut, upon counting more than one peak, searching for the peak within the given casing slowness range having the maximum coherence value and identifying it as the casing peak.

2. The method of claim 1 in which said rules include criteria for compressional wave components including highest coherence in the range of 40 to 150 u sec/ft., and in which
    said casing peak is excluded from said total peak matrix to form a new peak matrix, searching said new peak matrix in accordance with the compressional wave component rules to determine the presence of a compressional wave component.

3. The method of claim 2 in which said values are based upon criteria for shear wave components including upper and lower ranges of shear slowness based upon compressional slowness and in which said compressional peak is excluded from said new peak matrix to form another peak matrix, and searching said another peak matrix in accordance with said shear wave component values to determine the presence of a shear wave component.

4. The method of claim 3 in which said values are based upon criteria for Stoneley wave components including the lower limit of Stoneley slowness based upon the previously determined upper and lower range values of shear slowness and in which said shear wave peak is excluded from said another peak matrix to form yet another peak matrix, and searching said yet another peak matrix in accordance with said Stoneley wave component values to determine the presence of a Stonely wave component.

5. A method of sonic logging comprising the steps of:
deriving sonic logs representing the receipt of successive borehole depth levels, of sonic signals by receivers which are spaced along the length of a borehole sonde from each other and from at least one transmitter of the sonic signals, converting the sonic logs to peaks at the succession of borehole depth levels, of the coherence measure for the energy in the sonic signals, converting the sonic logs to peaks at the succession of borehole depth levels, of the coherence measure for the energy in the sonic signals, searching the peaks in accordance with criteria based upon borehole acoustics, sonde response and past history of coherence measure to identify compressional, shear and Stoneley components, and recording the identified components as a function of depth; and in which the compressional arrival is determined by selecting the peaks with slowness within a given compressional range and having a coherence value greater than a given coherence-cut for compressional to form a subgroup, screening the subgroup to delete those peaks whose time of arrival deviate from an integrated compressional time by more than a predetermined amount, and selecting the peak having a minimum arrival time as the compressional arrival.

6. A method of sonic logging comprising the steps of:
deriving sonic logs representing the receipt at successive borehole depth levels, of sonic signals by receivers which are spaced along the length of a borehole sonde from each other and from at least one transmitter of the sonic signals, converting the sonic logs to peaks at the succession of borehole depth levels, of the coherence measure for the energy in the sonic signals, searching the peaks in accordance with criteria based upon borehole acoustics, sonde response and past history of coherence measure to identify compressional, shear and Stonely components, and recording the identified components as a function of depth; and further in which the compressional arrival is determined by selecting from the peaks that peak having maximum coherence with slowness within a slowness range determined dynamically based upon the past history of compressional peak slowness, whose arrival time is within a predetermined amount of the integrated compressional time and is possessed of a coherence value greater than a given coherence cut for compressional.

7. A method of sonic logging comprising the steps of:
deriving sonic logs representing the receipt at successive borehole depth levels, of sonic signals by receivers which are spaced along the length of a borehole sonde from each other and from at least one transmitter of the sonic signals, converting the sonic logs to peaks at the succession of borehole depth levels, of the coherence measure for the energy in he sonic signals, searching the peaks in accordance with criteria based upon borehole acoustics, sonde response and past history of coherence measure to identify compressional, shear and Stonely components, and recording the identified components as a function of depth; and further in which the compressional arrival is determined by seeking a first candidate as the compressional arrival through a procedure of selecting the peaks with slowness within a given compressional range and having a coherence value greater than a given coherence-cut for compressional to form a subgroup, screening the subgroup to delete those peaks whose time of arrival deviate from an integrated compressional time by more than a predetermined amount, selecting the peak having a minimum arrival time as the first candidate for compressional arrival, seeking a second candidate as the compressional arrival by searching from among the peaks for a peak having maximum coherence with slowness within a slowness range determined dynamically based upon the past history of the compressional peak slowness, whose arrival time is within a predetermined amount of the integrated compressional time and is possessed of a coherence value greater than a given coherence-cut for compressional, upon the existence of both candidates, selecting the candidate with the higher coherence peak as the compressional peak.

8. The metod of claim 5 in which
the shear wave arrival is determined by selecting a subgroup of peaks with slowness S bounded by the following constraints:

$$Sc \times 1.3 < S < Sc \times 2.5$$

where Sc is the compressional slowness, screening the subgroup to delete peaks with arrival time greater than a predetermined value, and selecting the peak with the highest coherence value as the shear arrival.

9. A method of sonic logging comprising the steps of:
deriving sonic logs representing the receipt at successive borehole depth levels, of sonic signals by receivers which are spaced along the length of a borehole sonde from each other and from at least one transmitter of the sonic signals, converting the sonic logs to peaks at the succession of borehole depth levels, of the coherence measure for the energy in the sonic signals, searching the peaks in accordance with criteria based upon borehole acoustics, sonde response and past history of coherence measure to identify compressional, shear and Stoneley components, and recording the identified components as a function of depth; and in which the Stoneley arrival is dtermined by selecting a subgroup of peaks having slowness larger than a given fluid slowness and a coherence value higher than a coherence-cut for Stoneley waves, screening the subgroup to delete peaks having arrival times deviating from an integrated Stoneley arrival time by a predetermined amount, and selecting from the remaining peaks the peak having the highest energy as representative of Stoneley arrival.

* * * * *